(12) United States Patent
Sahoo et al.

(10) Patent No.: US 9,774,909 B2
(45) Date of Patent: Sep. 26, 2017

(54) UNIQUE PROTECTION OF RECORDED CONTENT

(71) Applicant: ARRIS Enterprises, Inc., Suwanee, GA (US)

(72) Inventors: Pradeep Kumar Sahoo, Bangalore (IN); Belmannu Harekrishna Acharya, Bangalore (IN); Murali S. Sahasranaman, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/843,802

(22) Filed: Sep. 2, 2015

(65) Prior Publication Data

US 2017/0064384 A1   Mar. 2, 2017

(51) Int. Cl.
| | | |
|---|---|---|
| H04N 21/441 | (2011.01) | |
| H04N 21/432 | (2011.01) | |
| H04N 21/4335 | (2011.01) | |
| H04N 21/4147 | (2011.01) | |
| H04N 21/475 | (2011.01) | |
| H04N 21/433 | (2011.01) | |
| H04N 21/835 | (2011.01) | |

(52) U.S. Cl.
CPC ....... *H04N 21/441* (2013.01); *H04N 21/4147* (2013.01); *H04N 21/4325* (2013.01); *H04N 21/4334* (2013.01); *H04N 21/4335* (2013.01); *H04N 21/4753* (2013.01); *H04N 21/835* (2013.01)

(58) Field of Classification Search
CPC .......... H04N 21/5781; H04N 21/4147; H04N 21/47214; H04N 21/4583; H04N 5/775; H04N 5/781; G06K 9/00436
See application file for complete search history.

(56) References Cited

U.S. PATENT DOCUMENTS

| | | | |
|---|---|---|---|
| 8,724,964 B2 | 5/2014 | Bhogal et al. | |
| 2006/0136690 A1* | 6/2006 | Hsieh | G06F 21/6227 711/164 |
| 2007/0283448 A1* | 12/2007 | Green | G06T 1/0021 726/28 |
| 2009/0100478 A1* | 4/2009 | Craner | G11B 19/00 725/87 |

\* cited by examiner

*Primary Examiner* — Huy T Nguyen
(74) *Attorney, Agent, or Firm* — Bart A. Perkins

(57) ABSTRACT

Methods, systems, and computer readable media can be operable to facilitate a unique protection of recorded content. A central device may be configured to establish and maintain associations between unique passwords and one or more individual recordings. A user may provide a unique password to be associated with one or more individual recordings. When a recording is associated with a unique password, the central device may require entry of the unique password before carrying out an action such as playback or deletion of the recording.

17 Claims, 11 Drawing Sheets

UNIQUE PROTECTION OF RECORDED CONTENT

TECHNICAL FIELD

This disclosure relates to the protection of recorded content.

BACKGROUND

When a piece of content is recorded at a central device such as a customer premise equipment (CPE) device (e.g., gateway device, set-top box (STB), etc.), the recording typically becomes available to everyone with access to the CPE device. A common password (e.g., parental control personal identification number (PIN) or password) may be used to protect all stored recordings from either being played back or deleted. However, anyone with knowledge of the common password would not be precluded from deleting or playing back any of the content recorded at the CPE device. Moreover, recorded content protected by a common password may still be accessed by users over a local home media architecture (HMA) or digital living network alliance (DLNA) network. Currently, there is no way for a user to protect a recording from being viewed or deleted by other users within a premise.

In general, a CPE device might utilize an automatic deletion mechanism to clean up and make available more disk space. For example, the CPE device might be configured to detect when disk space is nearing exhaustion, and the CPE device can select one or more of the oldest recordings or least-accessed recordings for deletion in order to free up disk space. However, a user might have certain recordings that should be bypassed by the automatic deletion mechanism. Therefore, users are left without a mechanism for protecting recordings from being accessed by others or from being deleted by others or an automatic deletion mechanism, thus it is desirable to improve upon methods and systems for protecting recorded content at a CPE device.

BRIEF DESCRIPTION OF THE DRAWINGS

Like reference numbers and designations in the various drawings indicate like elements.

DETAILED DESCRIPTION

Figure 1:
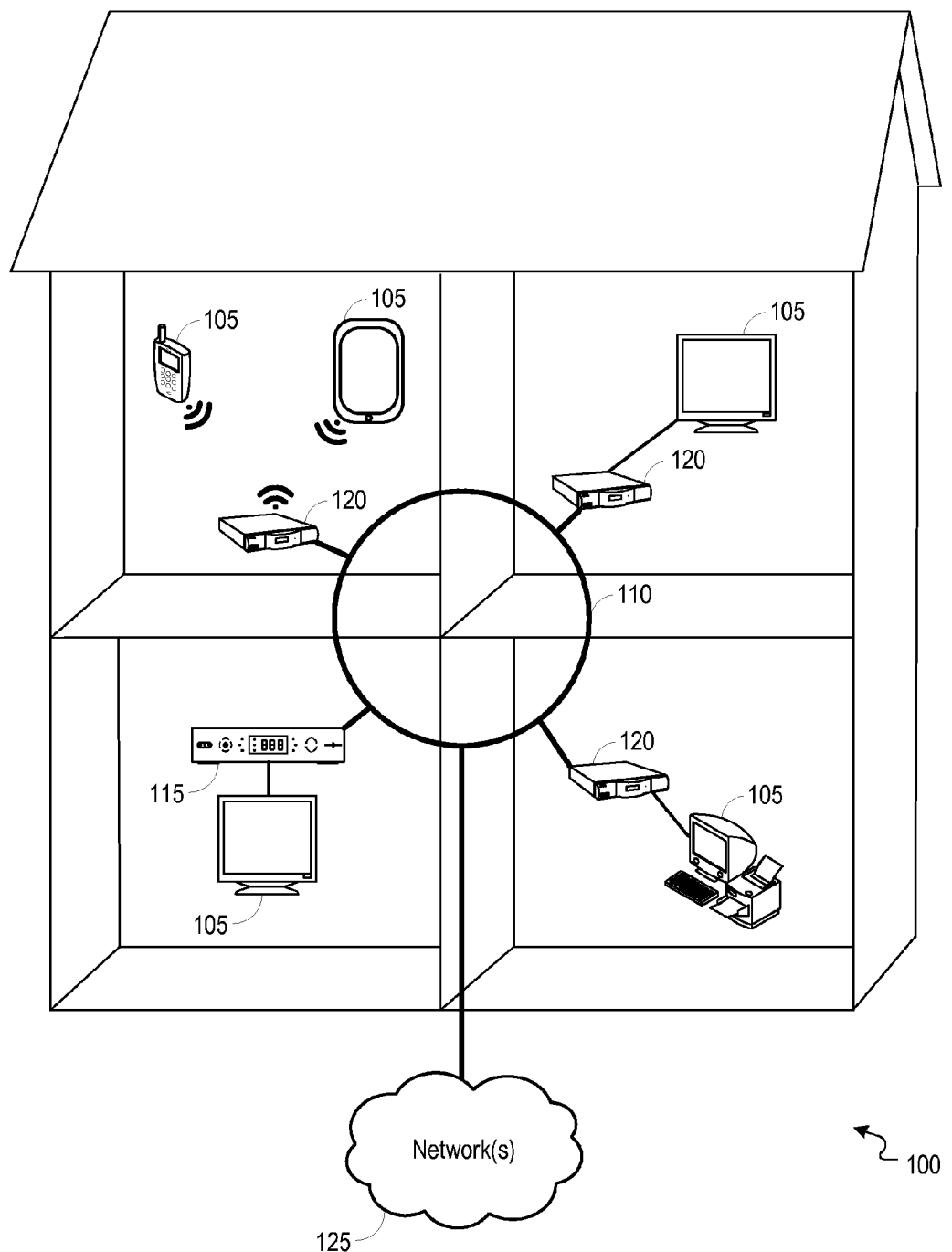
FIG. 1 is a block diagram illustrating an example network environment operable to facilitate a unique protection of recorded content.

It is desirable to improve upon methods and systems for protecting recorded content at a CPE device. Methods, systems, and computer readable media described herein can be operable to facilitate a unique protection of recorded content. A central device may be configured to establish and maintain associations between unique passwords and one or more individual recordings. A user may provide a unique password to be associated with one or more individual recordings. When a recording is associated with a unique password, the central device may require entry of the unique password before carrying out an action such as playback or deletion of the recording.

An embodiment of the invention described herein may include a method comprising: (a) establishing an association between a password and a recording, wherein the recording is designated by a user for association with the password; (b) receiving a request for an action to be carried out on the recording; (c) prompting a user for input of the password associated with the recording; (d) receiving a user-input password; (e) comparing the user-input password with the password associated with the recording; and (f) if the user-input password matches the password associated with the recording, carrying out the requested action on the recording.

According to an embodiment of the invention, the requested action comprises a playback of the recording.

According to an embodiment of the invention, the requested action comprises a deletion of the recording.

According to an embodiment of the invention, the password is associated with one or more portions of the recording.

According to an embodiment of the invention wherein the password is associated with one or more portions of the recording, if the user-input password does not match the password associated with the one or more portions of the recording, the one or more portions of the recording are skipped during a playback of the recording.

According to an embodiment of the invention wherein the password is associated with one or more portions of the recording, if the user-input password does not match the password associated with the one or more portions of the recording, the one or more portions of the recording are replaced with alternate content.

According to an embodiment of the invention, establishing an association between a password and a recording comprises: (a) receiving a user request to associate a recording with a password; (b) prompting a user for input of a personal identification number; (c) receiving a user-input personal identification number; (d) comparing the user-input personal identification number with a valid personal identification number; and (e) if the user-input personal identification number matches the valid personal identification number, accepting a user-input password to be associated with the recording.

According to an embodiment of the invention, a lifetime duration is associated with the recording, wherein the lifetime duration comprises a period of time for which the recording is to be stored before being deleted.

An embodiment of the invention described herein may include an apparatus comprising: (a) a module configured to establish an association between a password and a recording, wherein the recording is designated by a user for association with the password; (b) one or more interfaces configured to be used to: (i) receive a request for an action to be carried out on the recording; (ii) prompt a user for input of the password associated with the recording; and (iii) receive a user-input password; (c) a module configured to: (i) compare the user-input password with the password associated with the recording; and (ii) if the user-input password matches the password associated with the recording, carry out the requested action on the recording.

An embodiment of the invention described herein may include one or more non-transitory computer readable media having instructions operable to cause one or more processors to perform the operations comprising: (a) establishing an association between a password and a recording, wherein the recording is designated by a user for association with the password; (b) receiving a request for an action to be carried out on the recording; (c) prompting a user for input of the password associated with the recording; (d) receiving a user-input password; (e) comparing the user-input password with the password associated with the recording; and (f) if the user-input password matches the password associated with the recording, carrying out the requested action on the recording.

FIG. 1 is a block diagram illustrating an example network environment 100 operable to facilitate a personalized protection of recorded content. In embodiments, video, voice, and/or data services may be delivered to one or more client devices 105. Client devices 105 may include a television, mobile device, tablet, computer, gaming console, and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, and others.

Multiple services may be delivered to client devices 105 over one or more local networks 110. The local network(s) 110 may include a coaxial network, a local area network (LAN), wireless local area network (WLAN), personal area network (PAN), Multimedia over Coax Alliance (MoCA) network, mobile hotspot network, and any other interconnectivity operable to route communications to and from client devices 105. The local network 110 may be created by an interconnectivity existing between the one or more client devices 105 and one or more central devices existing at a subscriber premise. Central devices may include any device configured to facilitate communications between an upstream network and one or more client devices 105, such as a set-top box (STB), modem, gateway device, or other access device. It should be understood that one or more central devices may be integrated with each other or with other devices (e.g., client devices 105). For example, a modem may reside within a gateway device, STB, or other devices. It should be understood that delivery of the multiple services over the local network(s) 110 may be accomplished using a variety of standards and formats. It will be appreciated by those skilled in the relevant art that client devices 105 may be capable of interacting and communicating with each other and/or with a central device over various wired and wireless communication standards (e.g., Wi-Fi, Bluetooth, etc.).

In embodiments, the central devices may include one or more master STBs 115 and one or more peripheral STBs 120. The master STBs 115 may be configured to store recorded content and to output recorded content to peripheral STBs 120 through which a request for the recorded content is placed. The master STBs 115 may communicate with one or more upstream networks 125 to route requested content to one or more client devices 105 and/or one or more peripheral STBs 120.

In embodiments, a central device (e.g., master STB 115, peripheral STB 120, etc.) may establish and maintain associations between one or more recordings and user-input password information. For example, when a user designates a piece of content for recording at a central device, the user may input a unique password to be associated with the recording. The central device may store the association between the recording and the unique password, and may require input of the unique password before deleting the recording or outputting the recording for playback. Unique password information may be input by a user through a GUI presented to the user when designating a piece of content for recording.

A central device may be configured to enforce a master or parental control using a personal identification number (PIN). For example, a PIN may be stored at the central device, and the central device may be configured to require entry of the PIN before associating a recording with a unique password. The central device may be further configured to require entry of the PIN before deleting designated content or before outputting designated content for playback.

Figure 2:
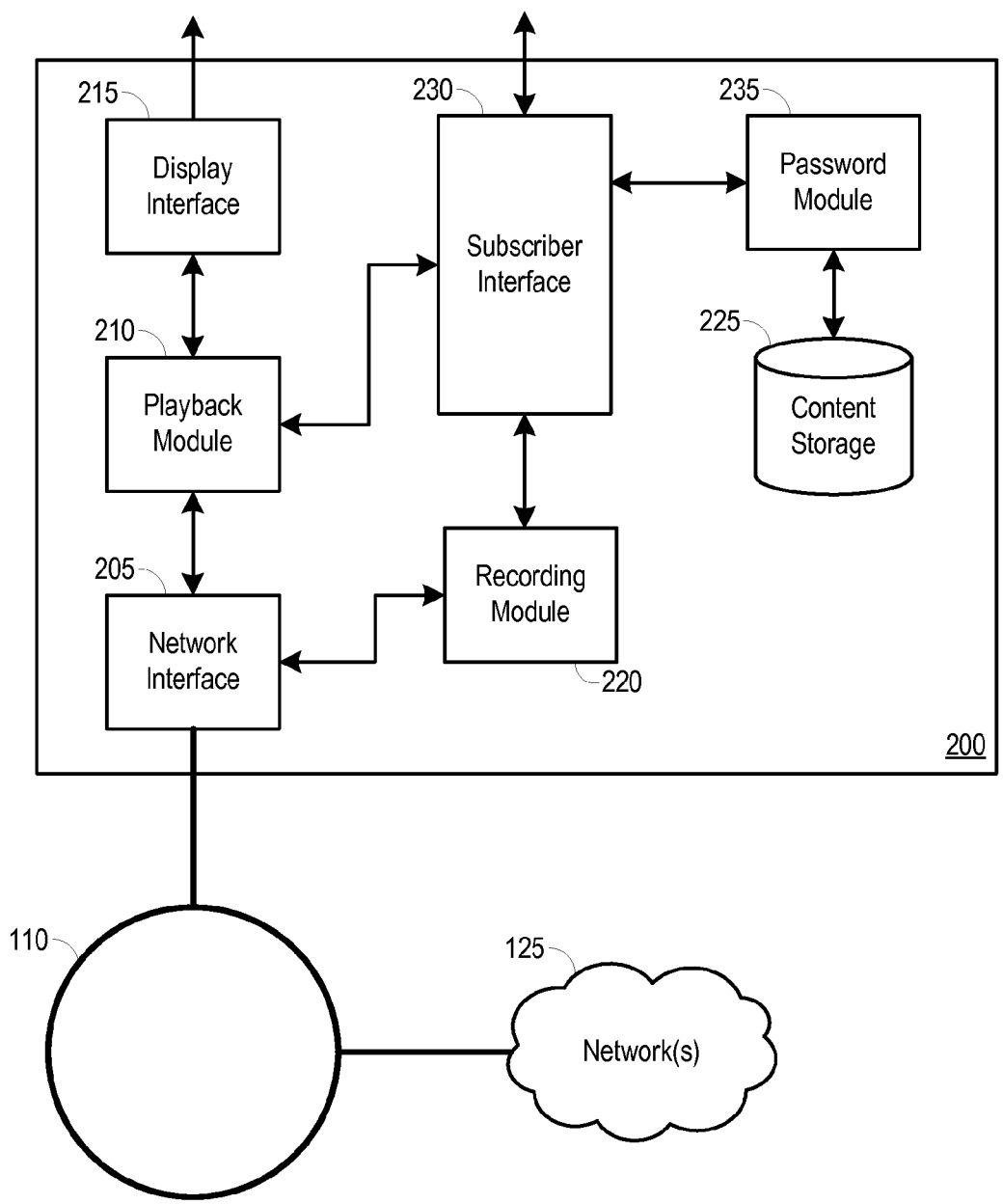
FIG. 2 is a block diagram illustrating an example central device operable to facilitate a unique protection of recorded content.

FIG. 2 is a block diagram illustrating an example central device 200 operable to facilitate a unique protection of recorded content. The central device 200 may include a network interface 205, a playback module 210, a display interface 215, a recording module 220, content storage 225, a subscriber interface 230, and a password module 235. In embodiments, the central device 200 may be a master STB 115 of FIG. 1, a peripheral STB 120, a gateway device, or any other CPE device configured to provide video services at a subscriber premise.

In embodiments, a network interface 205 may provide an interface for facilitating communications between the central device 200 and one or more other devices or networks. For example, communications between the central device 200 and one or more CPE devices (e.g., master STB 115, peripheral STB 120, etc.) or client devices 105 may be passed through the local network 110, and services may be received at the central device 200 from one or more upstream networks 125. It should be understood that a network interface 205 may be configured to receive and/or output communications using various communication techniques, protocols, and standards (e.g., Ethernet, Wi-Fi, Multimedia over Coax Alliance (MoCA), twisted pair, etc.).

In embodiments, a playback module 210 may control the output of multimedia content to one or more client devices 105 or a display associated with the central device 200. The playback module 210 may output content received through the network interface 205 from an upstream network 125 (e.g., linear content such as live television or other live programming) to a display or display device (e.g., television, computer, mobile device, tablet, gaming console, etc.)

through the display interface 215. The playback module 210 may output recorded content from storage at the central device (e.g., content storage 225) to a display or display device (e.g., television, computer, mobile device, tablet, gaming console, etc.) through the display interface 215.

In embodiments, the recording module 220 may process content for storing at the content storage 225. The recording module 220 may retrieve content, for example, from the playback module 210 or network interface 205 in response to the content being designated by a user for recording. The recording module 220 may process the content (e.g., encrypting, formatting, etc.) and output the content into content storage 225.

In embodiments, the recording module 220 may retrieve recorded content from content storage 225 for output to a requesting device (e.g., master STB 115 of FIG. 1, peripheral STB 120 of FIG. 1, client device 105 of FIG. 1, etc.). Recorded content may be output through the display interface 215 to a display or display device associated with the central device 200, or recorded content may be output through the network interface 205 to a device associated with the local network 110 (e.g., peripheral STB 120, client device 105, etc.).

In embodiments, a password module 235 may associate password information with one or more recordings stored at the content storage 225. For example, the password module 235 may associate a unique password with one or more individual recordings, and may create a flag that when recognized requires the input of the unique password before the one or more individual recordings are deleted or played back. The password module 235 may associate one or more portions of a recording stored at content storage 225 with a unique password.

The password module 235 may control access and/or deletion of recordings associated with a unique password. When a password protected recording is requested for playback or deletion, the password module 235 may output a request for input of a valid password and may deny any request for access or deletion until the valid password is received. In embodiments, the password module 235 may preclude deletion of a password protected recording via an auto-deletion mechanism or algorithm. For example, the password module 235 may require input of a valid password associated with a recording before a recording is deleted via an auto-deletion mechanism or algorithm (e.g., automatic deletion of oldest, largest, least-accessed recording, etc.).

In embodiments, a user may configure password information for one or more recordings through a GUI displayed to the user. For example, a GUI prompting user input of password information may be displayed to the user at a device through which the user is requesting a recording or designating content for recording. The password module 235 may receive user input password information through a subscriber interface 230 of the central device 200 or may receive user input password information from a device associated with the local network 110 (e.g., device that may communicate with the central device 200 over the local network 110 such as a peripheral STB 120, client device 105, etc.) via the network interface 205.

Figure 3:
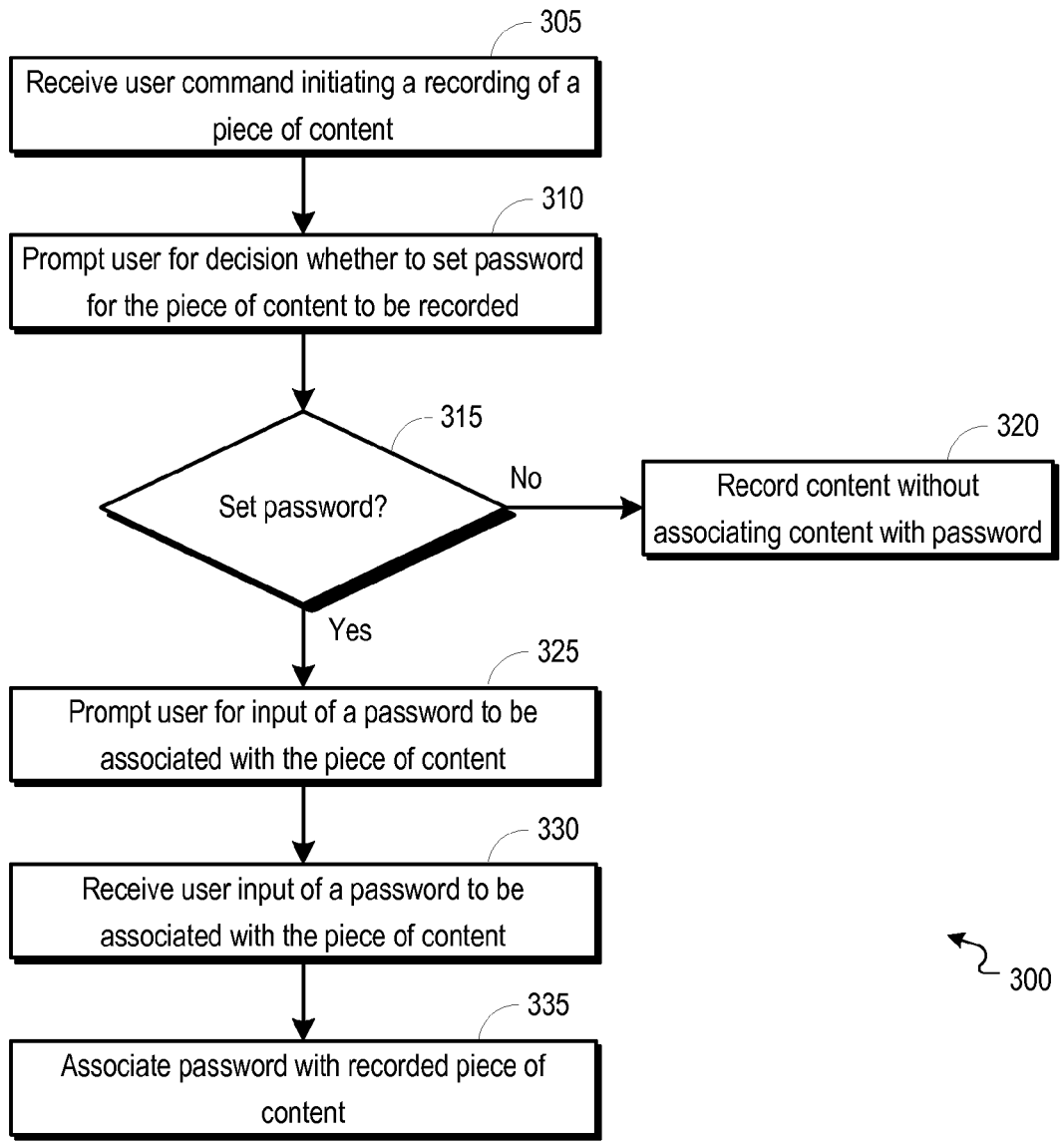
FIG. 3 is a flowchart illustrating an example process operable to facilitate the association between a recorded piece of content and a password.

FIG. 3 is a flowchart illustrating an example process 300 operable to facilitate the association between a recorded piece of content and a password. The process 300 can begin at 305, when a user initiates a recording of a piece of content. In embodiments, a central device (e.g., master STB 115 of FIG. 1, peripheral STB 120 of FIG. 1, etc.) may receive a user request that a piece of content be recorded by the central device. For example, a user may select a piece of content from a guide or list of upcoming or currently received programs and designate the piece of content for recording, or the user may initiate a recording of a piece of content that is currently being viewed by the user.

At 310, the central device may prompt the user for a decision whether to set a password for the piece of content to be recorded. In embodiments, a prompt for a user decision whether to set a password for the piece of content may be output to a device through which the user requested the piece of content to be recorded. For example, a graphical user interface (GUI) may be displayed at a display or display device associated with the device through which the user requested the piece of content to be recorded (e.g., master STB 115, peripheral STB 120, client device 105 of FIG. 1, etc.). The GUI may provide the user with the option to associate the piece of content designated for recording with a password.

At 315, the determination is made whether to associate a password with the piece of content to be recorded. In embodiments, the determination whether to associate a password with the piece of content to be recorded may be based upon the user decision whether to associate a password with the piece of content. For example, using a GUI displayed at a display or display device associated with the device through which the user requested the piece of content to be recorded, the user may select a displayed option to record the piece of content without associating the recording with a password or may select a displayed option to associate the recording with a password. If the user selects the option not to associate the recording with a password, the process 300 may proceed to 320 where the content is recorded without associating the recording with a password.

If, at 315, the user selects the option to associate the recording with a password, the process 300 may proceed to 325. At 325, the central device may prompt the user for input of a password that is to be associated with the recording. In embodiments, a prompt for user input of a password may be output to a device through which the user requested the piece of content to be recorded. For example, a graphical user interface (GUI) may be displayed at a display or display device associated with the device through which the user requested the piece of content to be recorded (e.g., master STB 115, peripheral STB 120, client device 105 of FIG. 1, etc.). The GUI may provide the user with a mechanism for inputting a password (e.g., a textbox) that is to be associated with the recording.

At 330, the central device may receive the password that is to be associated with the piece of content that is to be recorded. In embodiments, the central device may receive the password as a direct input from a user, or may receive the password from a different device. For example, a master STB 115 may receive a password as a direct input from a user, or when a peripheral STB 120 receives a password as a direct input from a user, the master STB 115 may receive the password from the peripheral STB 120.

At 335, the central device may associate the received password with the recorded piece of content. In embodiments, the piece of content designated for recording by the user may be recorded by and stored at the central device (e.g., master STB 115). For example, the designated piece of content may be recorded and stored at content storage 225 of FIG. 2. The central device may associate the stored recording with the password by storing the password and any information associated with the password (e.g., at content storage 225). A unique password associated with a recording may be stored within meta-data at the recording module 220 of FIG. 2 or password module 235 of FIG. 2, or may be stored within meta-data of the stored recording (e.g., as stored in the content storage 225).

Figure 4:
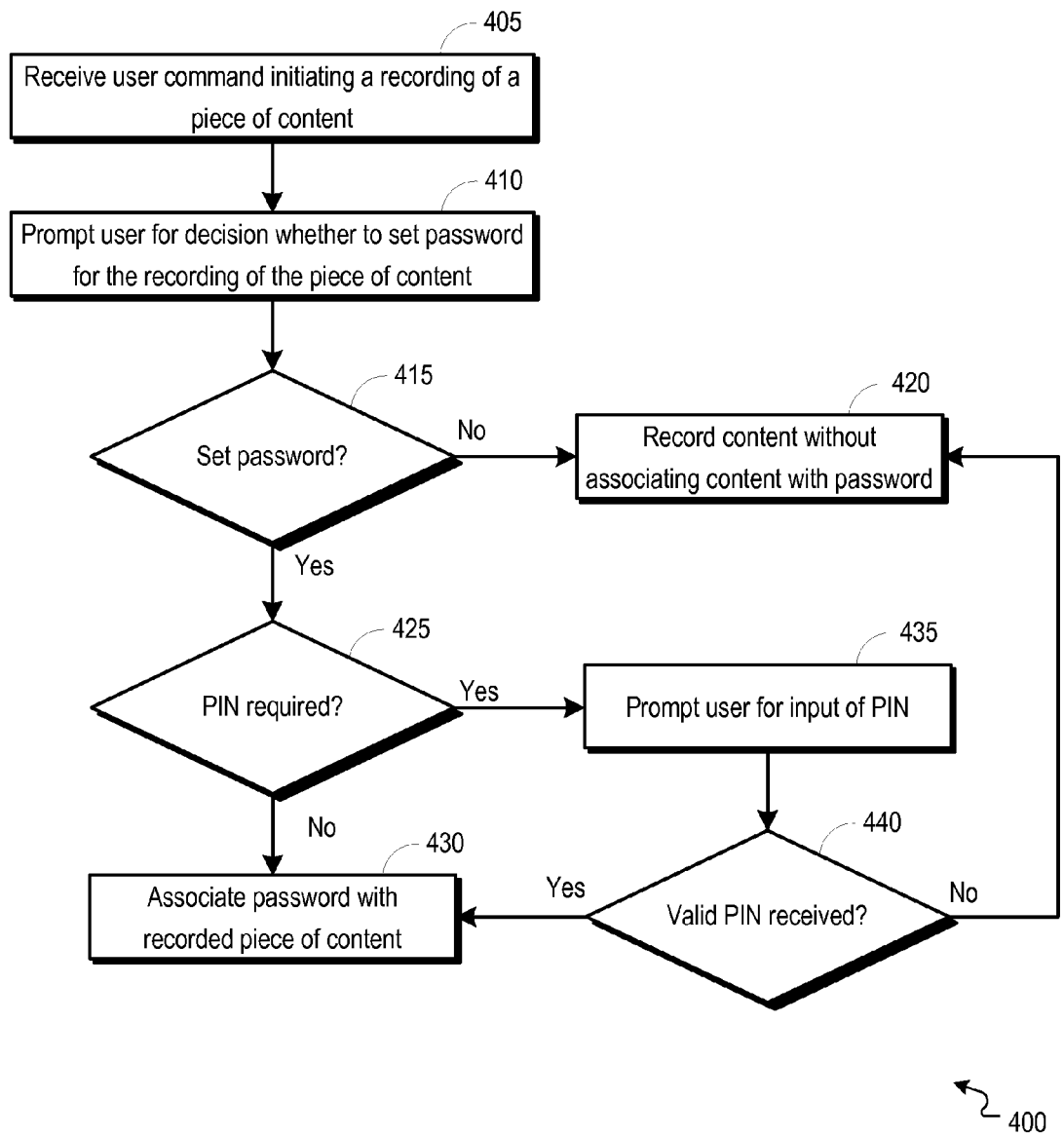
FIG. 4 is a flowchart illustrating an example process operable to facilitate the association between a recorded piece of content and a password and a personal identification number (PIN).

FIG. 4 is a flowchart illustrating an example process 400 operable to facilitate the association between a recorded piece of content and a password and a personal identification number (PIN). The process 400 can begin at 405, when a user initiates a recording of a piece of content. In embodiments, a central device (e.g., master STB 115 of FIG. 1, peripheral STB 120 of FIG. 1, etc.) may receive a user request that a piece of content be recorded by the central device. For example, a user may select a piece of content from a guide or list of upcoming or currently received programs and designate the piece of content for recording, or the user may initiate a recording of a piece of content that is currently being viewed by the user.

At 410, the central device may prompt the user for a decision whether to set a password for the piece of content to be recorded. In embodiments, a prompt for a user decision whether to set a password for the piece of content may be output to a device through which the user requested the piece of content to be recorded. For example, a graphical user interface (GUI) may be displayed at a display or display device associated with the device through which the user requested the piece of content to be recorded (e.g., master STB 115, peripheral STB 120, client device 105 of FIG. 1, etc.). The GUI may provide the user with the option to associate the piece of content designated for recording with a password.

At 415, the determination is made whether to associate a password with the piece of content to be recorded. In embodiments, the determination whether to associate a password with the piece of content to be recorded may be based upon the user decision whether to associate a password with the piece of content. For example, using a GUI displayed at a display or display device associated with the device through which the user requested the piece of content to be recorded, the user may select a displayed option to record the piece of content without associating the recording with a password or may select a displayed option to associate the recording with a password. If the user selects the option not to associate the recording with a password, the process 400 may proceed to 420 where the content is recorded without associating the recording with a password.

If, at 415, the user selects the option to associate the recording with a password, the process 400 may proceed to 425. At 425, the determination may be made whether a PIN is required to be input before allowing a password to be associated with a recording. The determination whether a PIN is required may be based on whether the central device has been configured with a setting requiring a PIN to be entered prior to a password being associated with a recording. For example, a user may configure a central device with a PIN, and the central device may be further configured with a setting that when enabled, requires that the PIN be entered before allowing a password to be associated with a recording.

If, at 425, the determination is made that a PIN is not required before a password is associated with a recording, the process 400 may proceed to 430. At 430, a password may be associated with the piece of content designated for recording. In embodiments, the central device may prompt the user for input of a password that is to be associated with the recording. For example, a graphical user interface (GUI) may be displayed at a display or display device associated with the device through which the user requested the piece of content to be recorded (e.g., master STB 115, peripheral STB 120, client device 105 of FIG. 1, etc.). The central device may receive the password that is to be associated with the piece of content that is to be recorded and may associate the received password with the recorded piece of content. In embodiments, the piece of content designated for recording by the user may be recorded by and stored at the central device (e.g., master STB 115), and the central device may associate the stored recording with the password by storing the password and any information associated with the password (e.g., at content storage 225). A unique password associated with a recording may be stored within meta-data at the recording module 220 of FIG. 2 or password module 235 of FIG. 2, or may be stored within meta-data of the stored recording (e.g., as stored in the content storage 225).

If, at 425, the determination is made that the entry of a PIN is required before a password is associated with a recording, the process 400 may proceed to 435. At 435, the central device may prompt the user for input of a valid PIN. For example, using a GUI displayed at a display or display device associated with the device through which the user requested the piece of content to be recorded, the user may be prompted to input a valid PIN.

At 440, the determination is made whether a valid PIN is received at the central device. In embodiments, the central device may compare a PIN that is input by a user to a valid PIN that is associated with the central device. For example, the central device may be configured with a valid PIN and the valid PIN may be stored at the central device. If the PIN input by the user matches the valid PIN, a password may be associated with the recording at 430. If, at 440, a valid PIN is not received, the piece of content may be recorded at 420 without associating the recording with a password.

Figure 5:
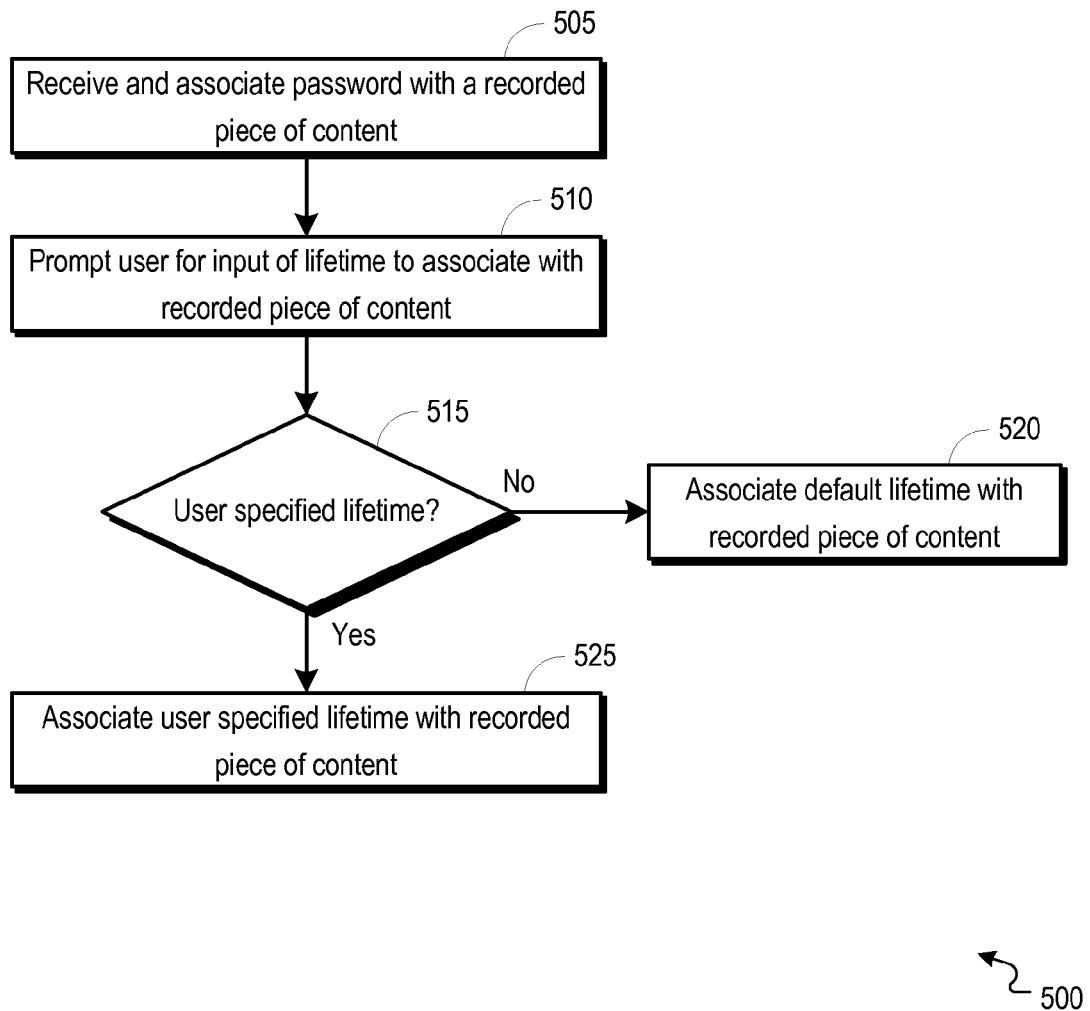
FIG. 5 is a flowchart illustrating an example process operable to facilitate the association between a recorded piece of content and a lifetime duration.

FIG. 5 is a flowchart illustrating an example process 500 operable to facilitate the association between a recorded piece of content and a lifetime duration. The process 500 can begin at 505, when a password is associated with a recorded piece of content. In embodiments, a password may be associated with a recording when a user initiates a recording of content at a device (e.g., master STB 115, peripheral STB 120, client device 105, etc.). The password associated with the recording may be based upon user input received through a displayed GUI. For example, a password may be associated with a recorded piece of content according to the process 300 of FIG. 3. The association between the password and the recording may be stored at a central device (e.g., master STB 115).

At 510, a user may be prompted to decide whether to set a lifetime duration for the piece of content to be recorded. In embodiments, a prompt for a user decision whether to set a lifetime for the piece of content may be output to a device through which the user requested the piece of content to be recorded. For example, a GUI may be displayed at a display or display device associated with the device through which the user requested the piece of content to be recorded (e.g., master STB 115, peripheral STB 120, client device 105 of FIG. 1, etc.). The GUI may provide the user with the option to associate the piece of content designated for recording with a lifetime duration. A lifetime duration may include a user-specified or default period of time for which the recorded piece of content is to be preserved or stored (e.g., period of time for which the recording is maintained at content storage 225 of FIG. 2).

At 515, the determination is made whether to associate a lifetime duration with the piece of content to be recorded. In embodiments, the determination whether to associate a lifetime duration with the piece of content to be recorded may be based upon the user decision whether to associate a lifetime with the piece of content. For example, using a GUI displayed at a display or display device associated with the device through which the user requested the piece of content to be recorded, the user may select a displayed option to record the piece of content without associating the recording with a lifetime or may select a displayed option to associate the recording with a user-specified lifetime or default lifetime. If the user selects the option not to associate the recording with a user-specified lifetime, the process 500 may proceed to 520 where the content is recorded and the recording is associated with a default lifetime. The central device may be configured to associate a recording with a default lifetime, and the default lifetime to be used may be based on various parameters including, but not limited to the type of content being recorded, a user-established preferential or priority level associated with the content being recorded, the length or size of the recording, and others.

If, at 515, the user selects the option to associate the recording with a user specified lifetime, the process 500 may proceed to 525. At 525, a user specified lifetime may be associated with the recorded piece of content. In embodiments, the central device may prompt the user for input of a specific lifetime that is to be associated with the recording. For example, a GUI may be displayed at a display or display device associated with the device through which the user requested the piece of content to be recorded (e.g., master STB 115, peripheral STB 120, client device 105 of FIG. 1, etc.). The GUI may provide the user with a mechanism for inputting a lifetime (e.g., a textbox, a scrollable or dropdown list of lifetime durations, etc.) that is to be associated with the recording. In embodiments, the central device may receive the lifetime as a direct input from a user, or may receive the lifetime from a different device (e.g., master STB 115 may receive user-specified lifetime from a peripheral STB 120). The central device may associate the stored recording with the user specified lifetime by storing the lifetime and any information associated with the lifetime (e.g., at content storage 225, recording module 220, or password module 235).

Figure 6:
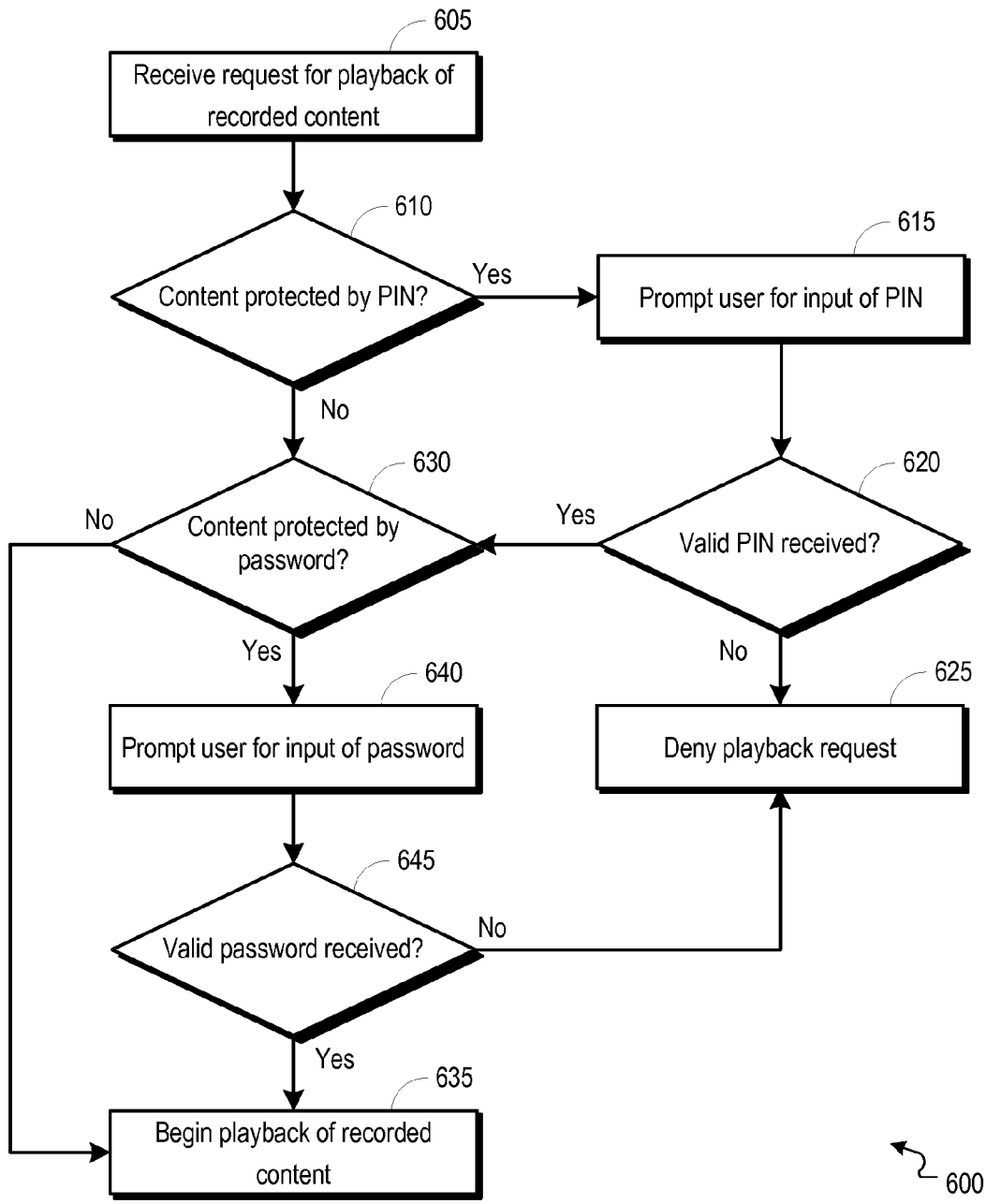
FIG. 6 is a flowchart illustrating an example process operable to facilitate the protection of recorded content from playback.

FIG. 6 is a flowchart illustrating an example process 600 operable to facilitate the protection of recorded content from playback. The process 600 can begin at 605, when a request for the playback of a recorded piece of content is received. In embodiments, the playback request may be received at a central device (e.g., master STB 115 of FIG. 1) as a direct input from a user or client device 105 of FIG. 1 or may be received from a peripheral device (e.g., peripheral STB 120 of FIG. 1).

At 610, the determination may be made whether the recording requested for playback is protected by a PIN. The determination whether the recording is protected by a PIN may be made, for example, by a recording module 220 of FIG. 2. In embodiments, the requested recording may be identified within storage, and information associated with the recording may be retrieved or consulted wherein the information includes PIN status data. The PIN status data may be used to identify whether playback of the recording requires an entry of a valid PIN, and may be further used to identify a valid PIN associated with the recording. In embodiments, the central device may be configured to require that a PIN be entered before allowing playback of recorded content. For example, a user such as a parent might configure the central device with a PIN that must be entered before playback of certain recorded content is allowed. A setting may be associated with each piece of recorded content, wherein the setting designates whether a PIN must be entered before allowing playback of the content. For example, a user may associate the recording with a PIN at the time the content is designated for recording, or the user may configure the central device to require entry of a PIN prior to the playback of certain types of recorded content or all pieces of recorded content.

If, at 610, the determination is made that the recorded content is protected by a PIN, the process 600 may proceed to 615. At 615, a user may be prompted for the input of a PIN associated with the requested content. In embodiments, the prompt for the input of a PIN may be displayed within a GUI that is presented to the user through a device from which the user requested the recording. For example, the GUI may include a textbox within which the user may input a PIN.

At 620, the determination may be made whether a valid PIN is received. The determination whether a valid PIN is received may be made, for example, by the password module 235 of FIG. 2. In embodiments, the PIN that is input by the user may be compared to a valid PIN that is associated with the requested piece of content. The valid PIN associated with the recording may be maintained, for example, at content storage 225 of FIG. 2. If the determination is made that a valid PIN has not been received, the central device may deny the playback request at 625. If the determination is made that a valid PIN has been received, the determination whether the requested content is protected by a password may be made at 630.

Returning to 610, if the determination is made that the requested content is not protected by a PIN, the process 600 may proceed to 630. At 630, the determination may be made whether the requested content is protected by a password. The determination whether the recording is protected by a password may be made, for example, by a recording module 220 of FIG. 2. In embodiments, the requested recording may be identified within storage, and information associated with the recording may be retrieved or consulted wherein the information includes password status data. The password status data may be used to identify whether playback of the recording requires an entry of a valid password, and may be further used to identify a valid password associated with the recording. If the determination is made that the requested content is not protected by a password, playback of the requested content may begin at 635.

If, at 630, the determination is made that the requested content is protected by a password, the process 600 may proceed to 640. At 640, a user may be prompted for the input of a password associated with the requested content. In embodiments, the prompt for the input of a password may be displayed within a GUI that is presented to the user through a device from which the user requested the recording. For example, the GUI may include a textbox within which the user may input a password.

At 645, the determination may be made whether a valid password is received. The determination whether a valid password is received may be made, for example, by the password module 235 of FIG. 2. In embodiments, the password that is input by the user may be compared to a valid password that is associated with the requested piece of content. The valid password associated with the recording may be maintained, for example, at content storage 225 of FIG. 2. If the determination is made that a valid password has not been received, the central device may deny the playback request at 625. If the determination is made that a valid password has been received, playback of the requested content may begin at 635.

Figure 7:
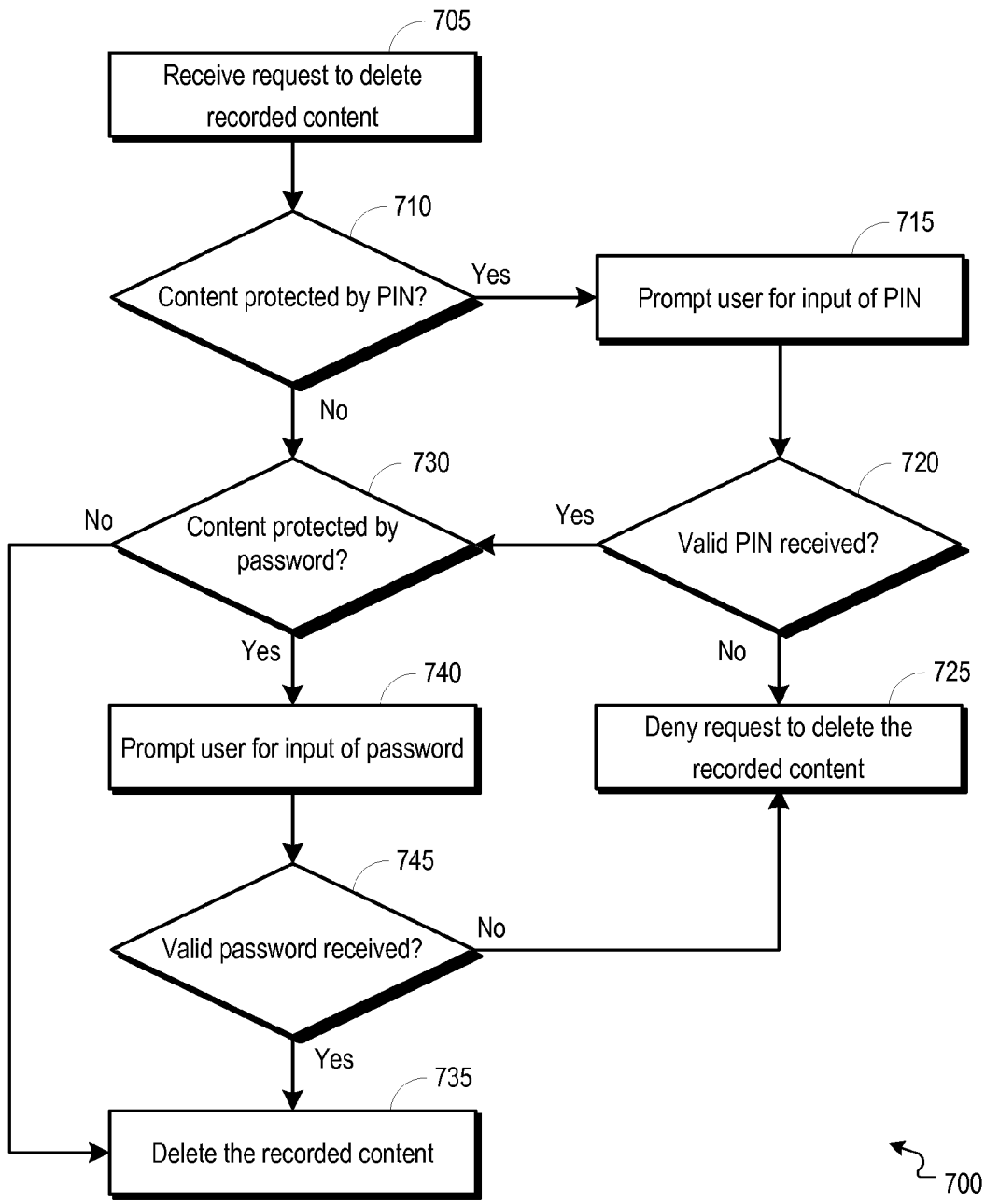
FIG. 7 is a flowchart illustrating an example process operable to facilitate the protection of recorded content from being deleted.

FIG. 7 is a flowchart illustrating an example process 700 operable to facilitate the protection of recorded content from being deleted. The process 700 can begin at 705, when a request for the deletion of a recorded piece of content is received. In embodiments, the delete request may be received at a central device (e.g., master STB 115 of FIG. 1) as a direct input from a user or client device 105 of FIG. 1 or may be received from a peripheral device (e.g., peripheral STB 120 of FIG. 1).

At 710, the determination may be made whether the recording requested for deletion is protected by a PIN. The determination whether the recording is protected by a PIN may be made, for example, by a recording module 220 of FIG. 2. In embodiments, the requested recording may be identified within storage, and information associated with the recording may be retrieved or consulted wherein the information includes PIN status data. The PIN status data may be used to identify whether deletion of the recording requires an entry of a valid PIN, and may be further used to identify a valid PIN associated with the recording. In embodiments, the central device may be configured to require that a PIN be entered before deleting a piece of recorded content. For example, a user such as a parent might configure the central device with a PIN that must be entered before certain recorded content is deleted. A setting may be associated with each piece of recorded content, wherein the setting designates whether a PIN must be entered before the content is deleted. For example, a user may associate the recording with a PIN at the time the content is designated for recording, or the user may configure the central device to require entry of a PIN prior to the deletion of certain types of recorded content or all pieces of recorded content.

If, at 710, the determination is made that the recorded content is protected by a PIN, the process 700 may proceed to 715. At 715, a user may be prompted for the input of a PIN associated with the requested content. In embodiments, the prompt for the input of a PIN may be displayed within a GUI that is presented to the user through a device from which the user requested the recording to be deleted. For example, the GUI may include a textbox within which the user may input a PIN.

At 720, the determination may be made whether a valid PIN is received. The determination whether a valid PIN is received may be made, for example, by the password module 235 of FIG. 2. In embodiments, the PIN that is input by the user may be compared to a valid PIN that is associated with the requested piece of content. The valid PIN associated with the recording may be maintained, for example, at content storage 225 of FIG. 2. If the determination is made that a valid PIN has not been received, the central device may deny the delete request at 725. If the determination is made that a valid PIN has been received, the determination whether the requested content is protected by a password may be made at 730.

Returning to 710, if the determination is made that the requested content is not protected by a PIN, the process 700 may proceed to 730. At 730, the determination may be made whether the requested content is protected by a password. The determination whether the recording is protected by a password may be made, for example, by a recording module 220 of FIG. 2. In embodiments, the requested recording may be identified within storage, and information associated with the recording may be retrieved or consulted wherein the information includes password status data. The password status data may be used to identify whether deletion of the recording requires an entry of a valid password, and may be further used to identify a valid password associated with the recording. If the determination is made that the requested content is not protected by a password, the recorded content may be deleted at 735.

If, at 730, the determination is made that the requested content is protected by a password, the process 700 may proceed to 740. At 740, a user may be prompted for the input of a password associated with the requested content. In embodiments, the prompt for the input of a password may be displayed within a GUI that is presented to the user through a device from which the user requested that the recording be deleted. For example, the GUI may include a textbox within which the user may input a password.

At 745, the determination may be made whether a valid password is received. The determination whether a valid password is received may be made, for example, by the password module 235 of FIG. 2. In embodiments, the password that is input by the user may be compared to a valid password that is associated with the requested piece of content. The valid password associated with the recording may be maintained, for example, at content storage 225 of FIG. 2. If the determination is made that a valid password has not been received, the central device may deny the delete request at 725. If the determination is made that a valid password has been received, the recorded content may be deleted at 735.

Figure 8:
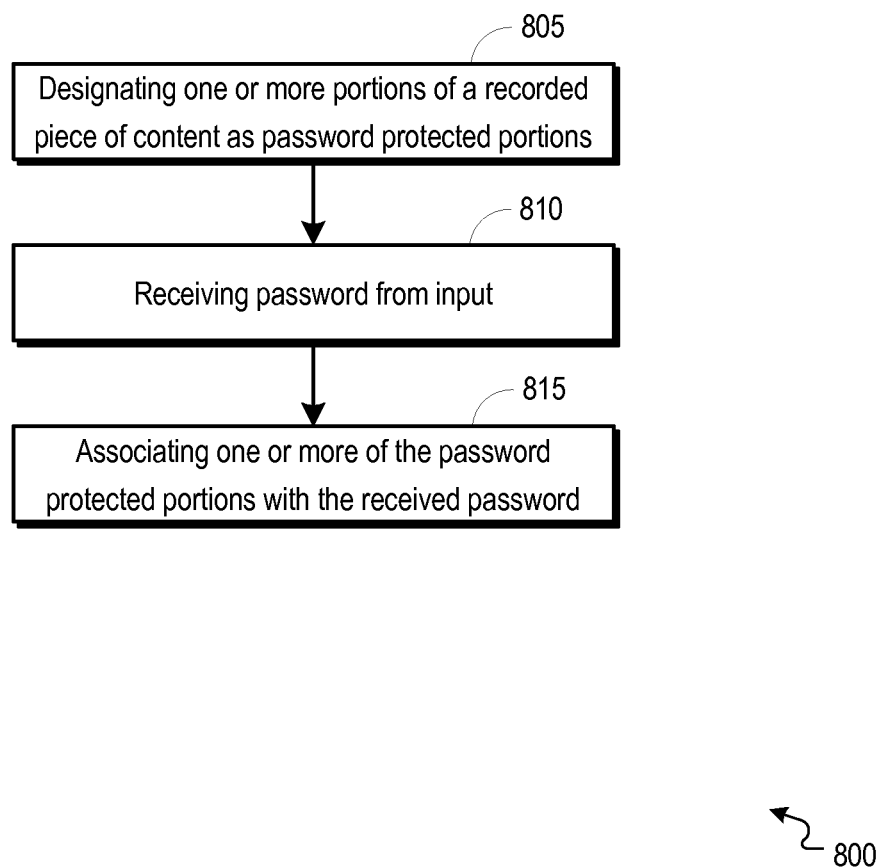
FIG. 8 is a flowchart illustrating an example process operable to facilitate the association between one or more portions of a recorded piece of content and a password.

FIG. 8 is a flowchart illustrating an example process 800 operable to facilitate the association between one or more portions of a recorded piece of content and a password. The process 800 may begin at 805 when one or more portions of a recording are designated as password protected portions. A password protected portion may be a segment or portion of a piece of content that the user may wish to make available for playback only upon the entry of an associated password. A central device (e.g., master STB 115 of FIG. 1) may maintain information designating one or more portions of a recording for password protection. For example, one or more points within a recording stored at content storage 225 of FIG. 2 may be marked to identify the points as a starting or ending point of a portion designated for password protection.

In embodiments, a portion of a piece of content may be designated for password protection at the time the content is being recorded or during playback of the content after the content has been recorded. During playback of the piece of content, a user may designate a portion of the content for password protection by identifying a beginning point and an ending point of the portion. For example, the user may mark the beginning point of a portion designated for password protection by pressing a first interface button (e.g., GUI touchscreen button, remote control device button, etc.) associated with a first password protection action, and the user may mark the ending point of the portion designated for password protection by again pressing the first interface button or by pressing a second interface button associated with a second password protection action.

In embodiments, a portion of a piece of content may be designated for password protection by identifying a starting point and an ending point within the piece of content for the portion designated for password protection. A GUI presented to a user may display one or more recordings that may be protected with a password. Upon a user selection of a recording, a GUI may be provided to the user that allows the user to input a starting point and an ending point for a portion designated for password protection. For example, if the user knows the starting time and ending time of the portion of the recording that is to be protected with a password, the user may input the starting time and ending time into the GUI. It should be understood that the starting point and or ending point of a portion of content designated for password protection may be a time reference relative to the piece of content, a reference to a scene change within the piece of content, or any other identification of a point within the piece of content.

At 810, a password may be received for association with one or more portions of a piece of content that are designated for password protection. In embodiments, using a GUI presented to a user, the user may input a password that is to be associated with a portion of a recording. A password may be received for association with each of a plurality of portions, or a password may be received for association with each individual portion of a piece of content.

At 815, one or more of the password protected portions may be associated with the received password. The password may be received by a central device (e.g., master STB 115), and the central device may associate the password with a portion of a corresponding recording. For example, the association between a password and a portion of a recording may be stored at content storage 225 of FIG. 2. In embodiments, a single password may be associated with a plurality of portions of a recorded piece of content, or different passwords may be associated with different portions of a recorded piece of content.

Figure 9:
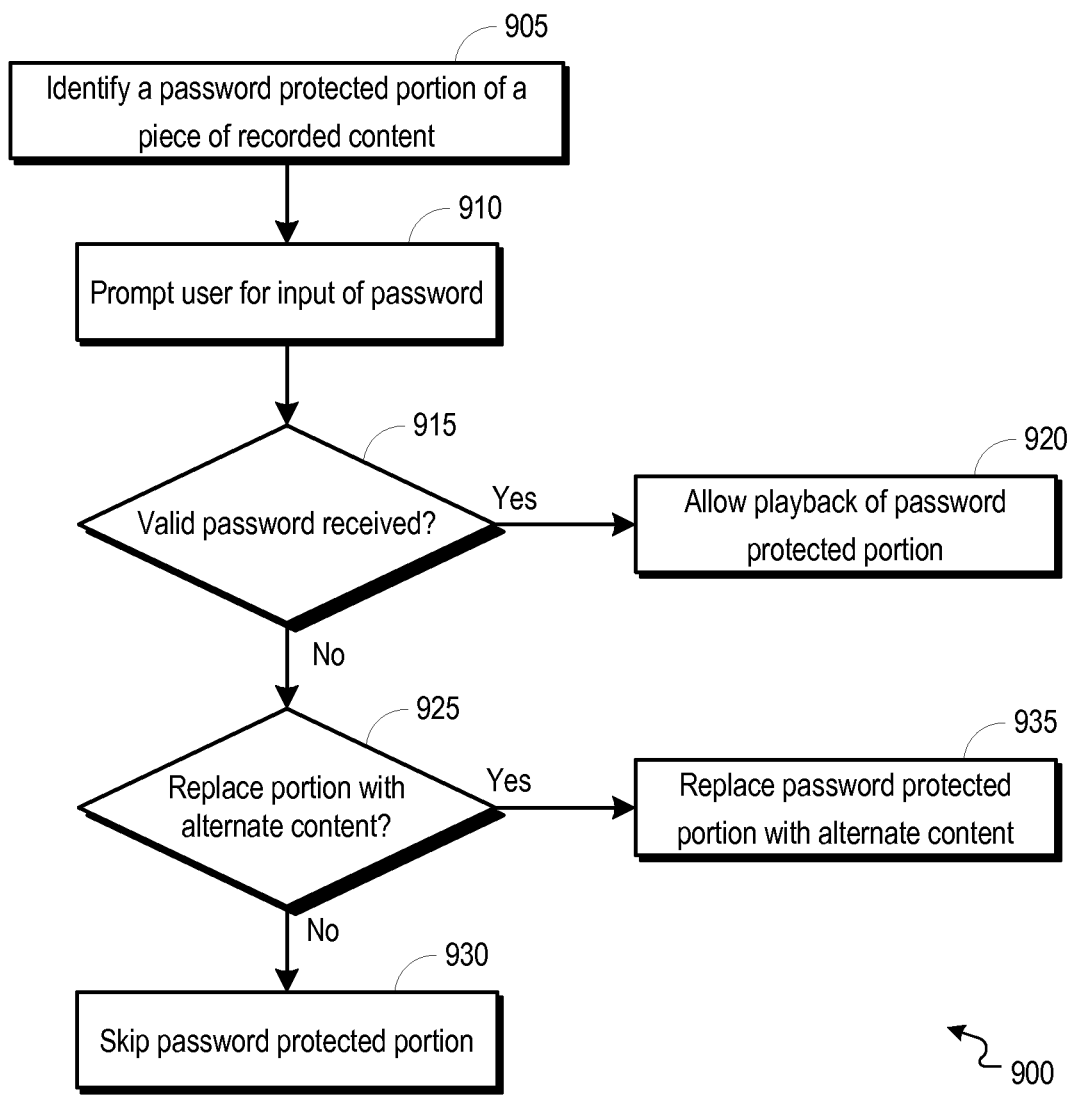
FIG. 9 is a flowchart illustrating an example process operable to facilitate the protection of password protected portions of recorded content from playback.

FIG. 9 is a flowchart illustrating an example process 900 operable to facilitate the protection of password protected portions of recorded content from playback. The process 900 can begin at 905, when one or more password protected portions of a recording are identified. The one or more password protected portions may be identified when a request is received for playback of the recording. For example, a central device (e.g., master STB 115 of FIG. 1) may determine that a requested recording (e.g., recording stored at content storage 225 of FIG. 2) comprises one or more portions that are protected by a password. In embodiments, a password protected portion may be identified when the beginning of the password protected portion is identified during playback of the underlying content. For example, a playback module (e.g., playback module 210 of FIG. 2) may identify the start of a password protected portion. The starting point and duration of a password protected portion may be identified from meta-data stored at the recording module 220 of FIG. 2 or password module 235 of FIG. 2.

At 910, a user may be prompted for the input of a password associated with the requested content. In embodiments, the prompt for the input of a password may be displayed within a GUI that is presented to the user through a device from which the user requested the recording. For example, the GUI may include a textbox within which the user may input a password. In embodiments, the user may be prompted for the input of a password before playback of the piece of content begins. In other embodiments, playback of the piece of content may begin without input of a password, and the user may be prompted for input of a password when the beginning point of a password protected portion is identified.

At 915, the determination may be made whether a valid password is received. The determination whether a valid password is received may be made, for example, by the password module 235 of FIG. 2. In embodiments, the password that is input by the user may be compared to a valid password that is associated with the requested piece of content or a specific portion of the piece of content. The valid password associated with the requested content or portion of content may be maintained, for example, at content storage 225 of FIG. 2. If the determination is made that a valid password has been received, playback of the password protected portion may begin or may otherwise be allowed at 920.

If, at 915, the determination is made that a valid password has not been received, the process 900 may proceed to 925. At 925, the determination may be made whether to replace the password protected portion with alternate content. In embodiments, a central device (e.g., master STB 115) may determine whether alternate content is available for replacing the password protected portion. The determination whether to replace the password protected portion may be further based upon the requested piece of content. If the determination is made not to replace the password protected portion with alternate content, the password protected portion may be skipped at 930. For example, a playback module (e.g., playback module 210 of FIG. 2) may identify the ending point of the password protected portion and may resume playback of the piece of content after the identified ending point.

If, at 925, the determination is made to replace the password protected portion with alternate content, the process 900 may proceed to 935. At 935, the password protected portion may be replaced with alternate content. In embodiments, alternate content such as default images or multimedia, advertisements, or any other content may be retrieved and output to a requesting device in place of the password protected portion. Alternate content may be retrieved from storage at a central device (e.g., content storage 225 of a master STB 115) or may be retrieved from an upstream server existing outside of a subscriber premise.

Figure 10:
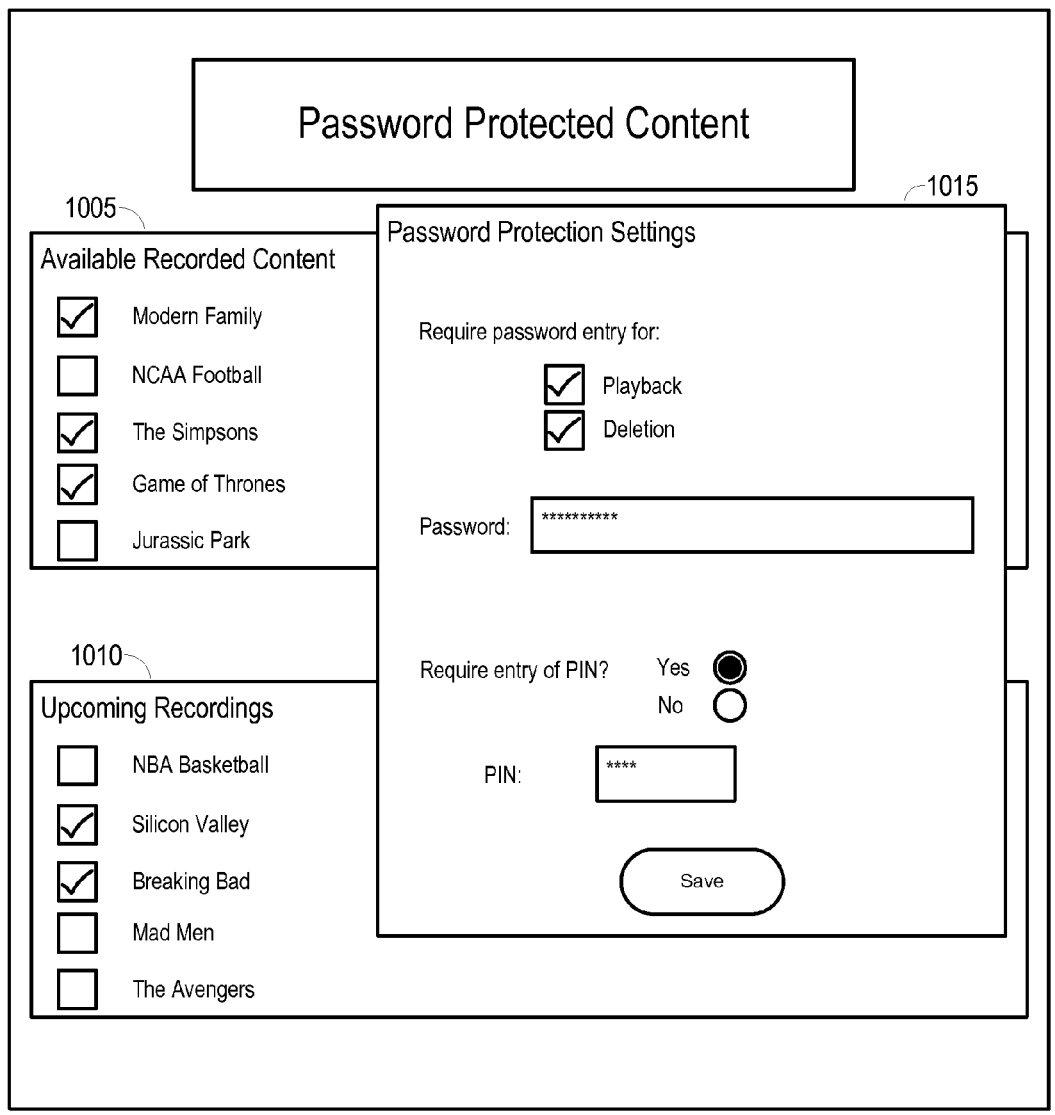
FIG. 10 is an example illustration of a graphical user interface that may be used to associate security settings with one or more pieces of content.

FIG. 10 is an example illustration of a graphical user interface 1000 that may be used to associate security settings with one or more pieces of content. In embodiments, the GUI 1000 may be displayed to a user in response to the user selecting an option to associate one or more available recordings and/or one or more upcoming recordings with security settings such as a password or PIN. It should be understood that the GUI 1000 may be output to a display device connected to or otherwise associated with a central device (e.g., master STB 115 of FIG. 1, peripheral STB 120 of FIG. 1, etc.).

The GUI 1000 may include a list of available recordings that may be password protected (e.g., available recorded content 1005) and/or a list of upcoming recordings that may be password protected (e.g., upcoming recordings 1010). In embodiments, a checkbox or tickbox may be associated with each recording displayed within the GUI 1000, and a user may select or engage the checkbox or tickbox associated with each respective recording for which the user wishes to configure security settings.

After selecting one or more recordings for associating with security settings, a display or window including various password options and password configuration settings may be displayed (e.g., password protection settings window 1015). Through the password protection settings window 1015, a user may associate one or more selected recordings with a password and/or PIN, and may further configure various settings for applying password/PIN protection to the protected recordings. The password protection settings window 1015 may provide a user with an option to select whether to protect a recording from playback and/or from being deleted. For example, a user may enable or disable (e.g., using a checkbox or tickbox) a requirement that a password be entered before allowing a selected recording to be played back and/or deleted. The password protection settings window 1015 may include a text box, within which a user may input the text for a password that is to be associated with the one or more selected recordings. The password protection settings window 1015 may also include an optional setting for requiring the entry of a PIN before allowing a recording to be deleted or played back. A text box may be provided within the password protection settings window 1015, wherein a user may input the text of a PIN to be associated with the one or more selected recordings.

Figure 11:
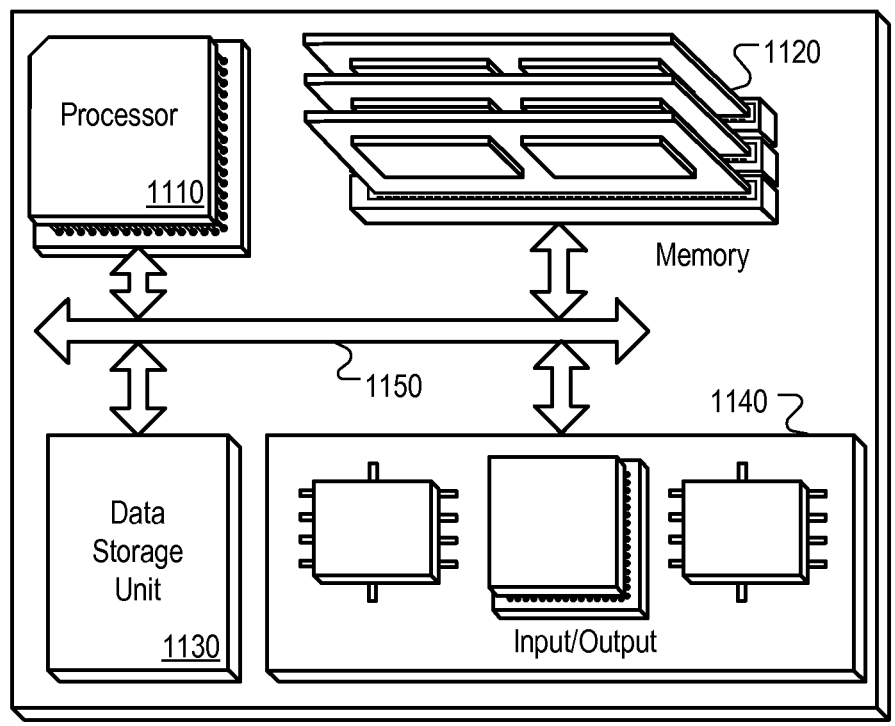
FIG. 11 is a block diagram of a hardware configuration operable to facilitate a unique protection of recorded content.

FIG. 11 is a block diagram of a hardware configuration 1100 operable to facilitate a unique protection of recorded content. The hardware configuration 1100 can include a processor 1110, a memory 1120, a storage device 1130, and an input/output device 1140. Each of the components 1110, 1120, 1130, and 1140 can, for example, be interconnected using a system bus 1150. The processor 1110 can be capable of processing instructions for execution within the hardware configuration 1100. In one implementation, the processor 1110 can be a single-threaded processor. In another implementation, the processor 1110 can be a multi-threaded processor. The processor 1110 can be capable of processing instructions stored in the memory 1120 or on the storage device 1130.

The memory 1120 can store information within the hardware configuration 1100. In one implementation, the memory 1120 can be a computer-readable medium. In one implementation, the memory 1120 can be a volatile memory unit. In another implementation, the memory 1120 can be a non-volatile memory unit.

In some implementations, the storage device 1130 can be capable of providing mass storage for the hardware configuration 1100. In one implementation, the storage device 1130 can be a computer-readable medium. In various different implementations, the storage device 1130 can, for example, include a hard disk device, an optical disk device, flash memory or some other large capacity storage device. In other implementations, the storage device 1130 can be a device external to the hardware configuration 1100.

The input/output device 1140 provides input/output operations for the hardware configuration 1100. In one implementation, the input/output device 1140 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to a CPE device (e.g., master STB 115 of FIG. 1, peripheral STB 120 of FIG. 1, etc.) or a client device 105 of FIG. 1 (e.g., television, STB, computer, mobile device, tablet, etc.). In embodiments, the input/output device can include driver devices configured to send communications to, and receive communications from one or more networks (e.g., local network 110 of FIG. 1, network(s) 125 of FIG. 1, etc.).

Those skilled in the art will appreciate that the invention improves upon methods and systems for protecting recorded content. Methods, systems, and computer readable media can be operable to facilitate a unique protection of recorded content. A central device may be configured to establish and maintain associations between unique passwords and one or more individual recordings. A user may provide a unique password to be associated with one or more individual recordings. When a recording is associated with a unique password, the central device may require entry of the unique password before carrying out an action such as playback or deletion of the recording.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   when a user designates a piece of content for recording at a central device, designating one or more portions of the recording for password-protection and establishing an association between a password and the one or more portions of the recording;
   receiving a request for an action to be carried out on a portion of the recording that is designated for password-protection;
   prompting a user for input of the password associated with the portion of the recording;
   receiving a user-input password;
   comparing the user-input password with the password associated with the portion of the recording; and
   if the user-input password matches the password associated with the portion of the recording, carrying out the requested action on the recording.

2. The method of claim 1, wherein the requested action comprises a playback of the recording.

3. The method of claim 1, wherein the requested action comprises a deletion of the recording.

4. The method of claim 1, further comprising:
   if the user-input password does not match the password associated with the portion of the recording, skipping the portion of the recording during a playback of the recording.

5. The method of claim 1, further comprising:
   if the user-input password does not match the password associated with the portion of the recording, replacing the portion of the recording with alternate content.

6. The method of claim 1, wherein establishing an association between a password and a recording comprises:
   receiving a user request to associate a recording with a password;
   prompting a user for input of a personal identification number;
   receiving a user-input personal identification number;
   comparing the user-input personal identification number with a valid personal identification number; and
   if the user-input personal identification number matches the valid personal identification number, accepting a user-input password to be associated with the recording.

7. The method of claim 1, further comprising:
   associating a lifetime duration with the recording, wherein the lifetime duration comprises a period of time for which the recording is to be stored before being deleted.

8. An apparatus comprising:
   a module configured to, when a user designates a piece of content for recording at a central device, designate one or more portions of the recording for password-protection and establish an association between a password and the one or more portions of the recording;
   one or more interfaces configured to be used to:
      receive a request for an action to be carried out on a portion of the recording that is designated for password-protection;
      prompt a user for input of the password associated with the portion of the recording;
      receive a user-input password;
   a module configured to:
      compare the user-input password with the password associated with the portion of the recording; and
      if the user-input password matches the password associated with the portion of the recording, carry out the requested action on the recording.

9. The apparatus of claim 8, wherein the requested action comprises a playback of the recording.

10. The apparatus of claim 8, wherein the requested action comprises a deletion of the recording.

11. The apparatus of claim 8, wherein the module is further configured to:
    if the user-input password does not match the password associated with the portion of the recording, skip the portion of the recording during a playback of the recording.

12. The apparatus of claim 8, wherein the module is further configured to:
    if the user-input password does not match the password associated with the portion of the recording, replace the portion of the recording with alternate content.

13. One or more non-transitory computer readable media having instructions operable to cause one or more processors to perform the operations comprising:
    when a user designates a piece of content for recording at a central device, designating one or more portions of the recording for password-protection and establishing an association between a password and the one or more portions of the recording;
    receiving a request for an action to be carried out on a portion of the recording;
    prompting a user for input of the password associated with the portion of the recording;
    receiving a user-input password;
    comparing the user-input password with the password associated with the portion of the recording; and
    if the user-input password matches the password associated with the portion of the recording, carrying out the requested action on the recording.

14. The one or more non-transitory computer-readable media of claim 13, wherein the requested action comprises a playback of the recording.

15. The one or more non-transitory computer-readable media of claim 13, wherein the requested action comprises a deletion of the recording.

16. The one or more non-transitory computer-readable media of claim 13, wherein the instructions are further operable to cause one or more processors to perform the operations comprising:

if the user-input password does not match the password associated with the portion of the recording, skipping the portion of the recording during a playback of the recording.

17. The one or more non-transitory computer-readable media of claim 13, wherein the instructions are further operable to cause one or more processors to perform the operations comprising:

if the user-input password does not match the password associated with the portion of the recording, replacing the portion of the recording with alternate content.

\* \* \* \* \*